(12) United States Patent
Hamidi-Sepehr et al.

(10) Patent No.: US 11,638,246 B2
(45) Date of Patent: Apr. 25, 2023

(54) ENHANCED PDCCH MONITORING IN NEW RADIO SYSTEMS

(71) Applicant: Apple Inc., Cupertino, CA (US)

(72) Inventors: Fatemeh Hamidi-Sepehr, Santa Clara, CA (US); Debdeep Chatterjee, San Jose, CA (US); Toufiqul Islam, Santa Clara, CA (US); Sergey Panteleev, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 100 days.

(21) Appl. No.: 17/267,091

(22) PCT Filed: Aug. 8, 2019

(86) PCT No.: PCT/US2019/045663
§ 371 (c)(1),
(2) Date: Feb. 9, 2021

(87) PCT Pub. No.: WO2020/033652
PCT Pub. Date: Feb. 13, 2020

(65) Prior Publication Data
US 2021/0168782 A1 Jun. 3, 2021

Related U.S. Application Data

(60) Provisional application No. 62/717,342, filed on Aug. 10, 2018.

(51) Int. Cl.
*H04W 72/04* (2009.01)
*H04W 72/0446* (2023.01)

(52) U.S. Cl.
CPC ..... *H04W 72/042* (2013.01); *H04W 72/0446* (2013.01)

(58) Field of Classification Search
CPC .................. H04W 72/042; H04W 72/0446
See application file for complete search history.

(56) References Cited

U.S. PATENT DOCUMENTS

2009/0088148 A1* 4/2009 Chung .................. H04L 5/0053
2016/0043849 A1 2/2016 Moon-il et al.
(Continued)

FOREIGN PATENT DOCUMENTS

WO 2018144899 A1 8/2018

OTHER PUBLICATIONS

International Preliminary Report on Patentability dated Feb. 16, 2021 for International Application No. PCT/US2019/045663.
(Continued)

*Primary Examiner* — Ronald B Abelson
(74) *Attorney, Agent, or Firm* — Eschweiler & Potashnik, LLC

(57) ABSTRACT

Systems, apparatuses, methods, and computer-readable media are provided for a user equipment (UE) device that includes one or more processors configured to identify a search space for physical downlink control channel (PDCCH) candidates by: determining whether the search space is a group common search space or a UE specific search space; determining a number of PDCCH candidates per aggregation level (AL); determining a PDCCH monitoring periodicity and a PDCCH monitoring offset for the search space, each including a plurality of slots; determining monitored slots in the monitoring periodicity; determining, for each monitored slot, a monitoring pattern including a set of selected symbols; and determining a set of monitoring occasions corresponding to the set of selected symbols in each monitored slot of each monitoring periodicity. The one or more processors are configured to decode downlink
(Continued)

signals received in the set of monitoring occasions to search for PDCCH information for the UE.

19 Claims, 3 Drawing Sheets

(56) References Cited

U.S. PATENT DOCUMENTS

2019/0190582 A1* 6/2019 Guo .................... H04W 72/046
2020/0367253 A1* 11/2020 Kim .................... H04W 72/042

OTHER PUBLICATIONS

"Extended European Search Report for European Patent Application No. 19847737.4", dated Mar. 17, 2022, 11 Pages.
"Modifications for UE procedure for receiving control information", in 3GPP TSG RAN WG1 Meeting #92bis, Apr. 16-20, 2018, 8 Pages.
"Discussion of search space design", in 3GPP TSG RAN WG1 Meeting #90bis, Oct. 9-13, 2017, 13 Pages.
"PDCCH search space design", in 3GPP TSG RAN WG1 Meeting AH_#NR3, Sep. 18-21, 2017, 10 Pages.
International Search Report dated Nov. 22, 2019 for International Application No. PCT/US2019/045663.
"Remaining issues on search space." Source: ZTE. Agenda: 7.1.3.1.2. 3GPP TSG RAN WG1 Meeting #93, Busan, Korea, May 21-25, 2018. R1-1806128.
"Search space design and related issues." Source: ZTE, Sanechips. Agenda Item: 7.1.3.1.2. 3GPP TSG RAN WG1 Meetting #92Bis, Sanya, China, Apr. 16-20, 2018. R1-1805263.
"Remaining details of NR PDCCH search space." Agenda Item: 7.1.3.1.2. Source: CATT. 3GPP TSG RAN WG1 Meeting #93, Busan, Korea, May 21-25, 2018. R1-1806289.
"Remaining issues on search space." Source: LG Electronics. Agenda Item: 7.1.3.1.2. 3GPP TSG RAN WG1 Meeting #93, Busan, Korea, May 21-25, 2018. R1-1806616.
5G; NR; Physical layer procedures for control; (3GPP TS 38.213 version 15.2.0 Release 15); ETSI TS 138 213 V15.2.0; Jul. 2018.
5G; NR; Radio Resource Control (RRC); Protocol specification; (3GPP TS 38.331 version 15.2.1 Release 15); ETSI TS 138 331 V15.2.1; Jun. 2018.

* cited by examiner

ENHANCED PDCCH MONITORING IN NEW RADIO SYSTEMS

CROSS REFERENCE TO RELATED APPLICATIONS

This application is a National Phase entry application of International Patent Application No. PCT/US2019/045663 filed Aug. 8, 2019, which claims priority to U.S. Provisional Patent Application No. 62/717,342 filed on Aug. 10, 2018, entitled "ENHANCED PDCCH MONITORING IN NR SYSTEMS," and is hereby incorporated by reference in its entirety.

BACKGROUND

Various examples generally may relate to the field of wireless communications.

DETAILED DESCRIPTION

Figure 1:
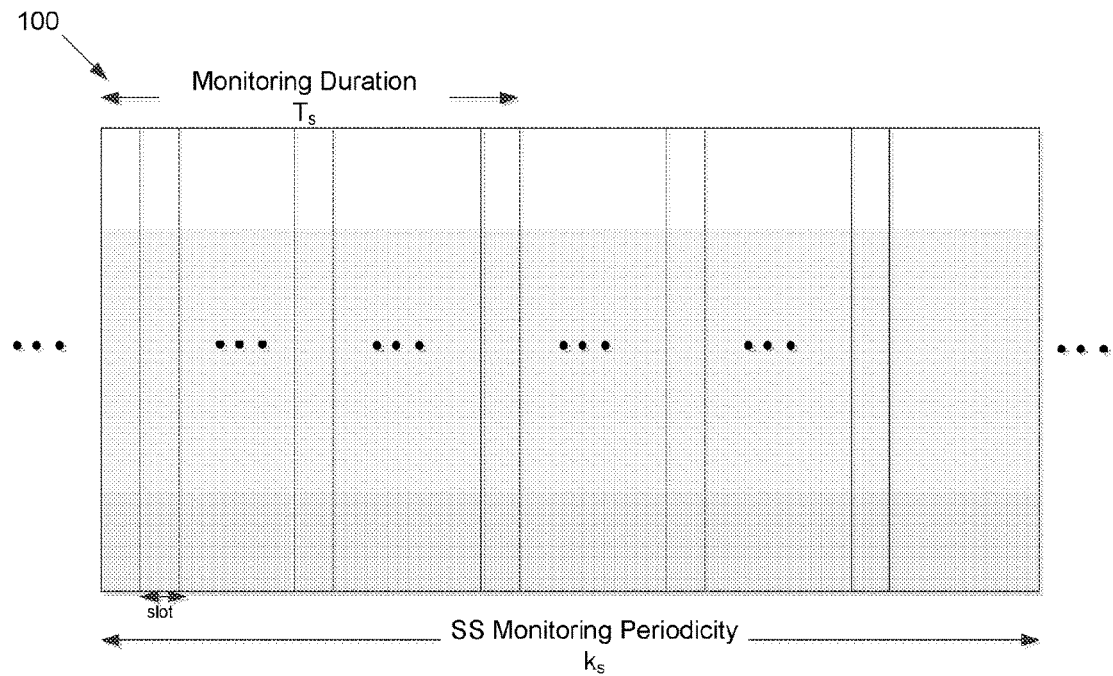
FIG. 1 depicts an exemplary search space monitoring periodicity including a monitoring duration in accordance with some examples.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various examples. However, it will be apparent to those skilled in the art having the benefit of the present disclosure that the various aspects of the various examples may be practiced in other examples that depart from these specific details. In certain instances, descriptions of well-known devices, circuits, and methods are omitted so as not to obscure the description of the various examples with unnecessary detail. For the purposes of the present document, the phrase "A or B" means (A), (B), or (A and B).

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various examples. However, it will be apparent to those skilled in the art having the benefit of the present disclosure that the various aspects of the various examples may be practiced in other examples that depart from these specific details. In certain instances, descriptions of well-known devices, circuits, and methods are omitted so as not to obscure the description of the various examples with unnecessary detail. For the purposes of the present document, the phrase "A or B" means (A), (B), or (A and B).

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that target to meet vastly different and sometime conflicting performance dimensions and services. Such diverse multi-dimensional requirements are driven by different services and applications. In general, NR will evolve based on 3GPP LTE-Advanced with additional potential new Radio Access Technologies (RATs) to enrich people lives with better, simple and seamless wireless connectivity solutions. NR will enable everything connected by wireless and deliver fast, rich contents and services.

In order to support ultra-reliable low-latency communication (URLLC) services which target 1 ms latency and 99.999% reliability, control and shared channels should employ advanced transmission schemes which maximize diversity and energy within a very short transmission interval. In that sense, reliability of PDCCH is critical to provide both DL and UL operation. Recently, support of 16 CCE per decoding candidate was agreed that brings improved coverage for the considered eMBB use cases. However, in order to efficiently support URLLC requirements, further enhancements to NR PDCCH and DCI format designs are expected.

In this disclosure, various examples may include various processes related to PDCCH monitoring enhancements, achieving more flexibility in terms of monitoring occasions and scheduling opportunities. This allows better adaptation to different traffic patterns and requirements, especially corresponding to URLLC services. In particular, processes and apparatus are disclosed that further adapt and extend the concept of monitoring duration, its applicability, and its indication; and provide dynamic adaptation of PDCCH monitoring occasions as well as mapping and dropping rules to maintain UE BD and CCE requirements In NR, the concept of PDCCH monitoring periodicity is defined per search space set and is not configured at the CORESET-level. FIG. 1 illustrates an exemplary search space periodicity 100. The PDCCH monitoring periodicity is defined through two levels of configuration, mainly, the search space monitoring periodicity in terms of the number of slots, as well as the monitoring occasions defined in terms of the symbols within slots. Particularly, the parameter "monitoringSlotPeriodicityAndOffset" is defined within the PDCCH search space set configurations, to configure the PDCCH monitoring periodicity and the offset at the slot-level granularity. Further, "monitoredSymbolsWithinSlot" is defined to configure the PDCCH monitoring pattern within a slot, indicating first symbol of the CORESET. Every configured search space with a certain monitoring periodicity in terms of slots and starting symbols within the monitored slots, is associated with a CORESET.

The concept of monitoring duration (for which the length is RRC configured, ranging from one up to (ks−1), where ks is the search space monitoring periodicity) has been further introduced to the search space, to indicate the number of consecutive slots over which the one or more monitoring occasions for the corresponding PDCCH common search space (CSS) in a slot repeat (see FIG. 1). Particularly, the duration defines the number of slots that a search space lasts in every occasion (at every period as given in the monitoringSlotPeriodicityAndOffset). The UE does not monitor PDCCH for the corresponding search space set for the next (ks—monitoring duration) consecutive slots. The monitoring duration allows bursts and gaps of monitoring, in terms of number of subsequent slots, all the way up to the search space monitoring periodicity. In other words, the purpose of such window is to increase the duration of the PDCCH monitoring time in non-contiguous bursts to cater to bursty traffic profiles while enabling a trade-off against UE power consumption via use of larger monitoring periodicity values.

In this section, different options are presented for configuring and/or indicating monitoring duration. Unless mentioned otherwise, the examples related to PDCCH monitoring are applicable to different duplex systems, such as FDD, TDD, bandwidth parts with different numerologies, such as 15 kHz, 30 kHz, 60 kHz, 120 kHz etc., licensed and unlicensed spectrum access, etc.

The monitoring duration can be configured as part of a UE-specific search space (UESS) set configured to the UE, possibly if the UE indicates support of this feature for a PDCCH UESS. In an example, a monitoring duration may only be applied with different Transmission Configuration Indication (TCI) states or quasi co-location (QCL) assumptions across the repetitions of the monitoring slots within a duration for the same search space set. Here, the TCI states may include information on different types of QCL parameters including average delay, average Doppler, delay spread, Doppler spread, average power, and spatial Rx parameters. Further, such an extension of the QCL may be limited to frequency range 2 (FR2) deployments (i.e., deployments with carrier frequency higher than 6 GHz).

In another example, further adaptation of the monitoring duration may be realized in a more dynamic manner compared to the option of using dedicated RRC signaling as part of the search space set configuration. In various examples, such dynamic indication may be achieved via use of MAC control element (CE), or by a "group-common" or UE-specific PDCCH carrying a DCI format, to allow more flexibility in monitoring configurations.

If the traffic is bursty but with any of higher reliability and/or low latency requirements, then such dynamic signaling to adapt monitoring window can realize dynamic adaptation of the monitoring periodicity for a search space, to provide a burst of scheduling opportunities, with relatively larger gaps in between.

Figure 2:
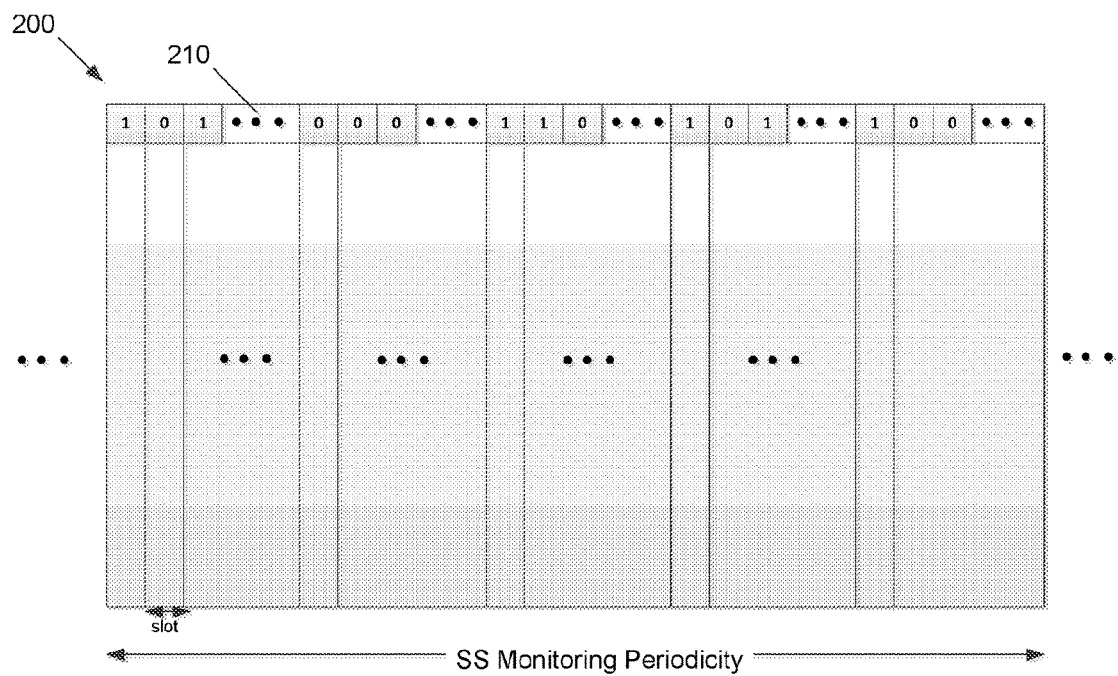
FIG. 2 depicts an exemplary search space monitoring periodicity including a monitoring duration as defined by a bitmap in accordance with some examples.

FIG. 2 illustrates another example search space periodicity 200, in which a fully flexible bitmap 210 of length of search space monitoring periodicity can be used to enable configuring each slot within one monitoring period, as enabled or disabled in terms of the monitoring occasions, through one to one mapping of each bit in the bitmap to each slot.

In some legacy systems, all the monitoring configurations are with granularity of a slot, i.e, the bitmap "monitoredSymbolsWithinSlot" is repeated in each of the "repeated slots".

In an example, instead of just turning "ON" or "OFF" of the monitoring for a slot using the monitoring duration parameter or a bitmap of length equal to the monitoring periodicity, slots may be identified as "monitoring a reduced set of occasions (e.g., only first 3-symbols) or full set of occasions, e.g., identified by "monitoredSymbolsWithinSlot". Accordingly, the monitoring duration or a bitmap indicating set of monitored slots within the monitoring period, as carried by the search space set configuration (via dedicated RRC signaling) identifies the slots in which the UE is expected to monitor all configured monitoring occasions within each of the respective slots, while for the remaining slots within the monitoring period, the UE is expected to monitor a reduced set of monitoring occasions within the respective slots. In another variant of the example, such identifying parameters (e.g., monitoringDuration2 or bitmapMonitoredSlots2) is applied in addition to the configuration of monitoring duration of bitmap described above. In such a case, the maximum length of the parameters monitoringDuration2 or bitmapMonitoringSlots2 is given by the length $m_s$ of the "monitoring duration" parameter or the number of '1's in the bitmap of monitored slots within the monitoring period.

Further, for additional flexibility, RRC signaling may be used to further identify a sub-set of monitoring occasions within a slot to be monitored in the slots with "reduced monitoring" as an extension to the option of specifying these monitoring occasions to be within the first three symbols of a slot.

While the above examples and examples have been described with the assumption of a slot duration being the minimum granularity for indicated monitoring configurations via monitoring duration or bitmap options, these can be equally applicable and extended for durations that span less than slot duration (e.g., a half-slot duration), or a set consecutive slots.

Figure 3:
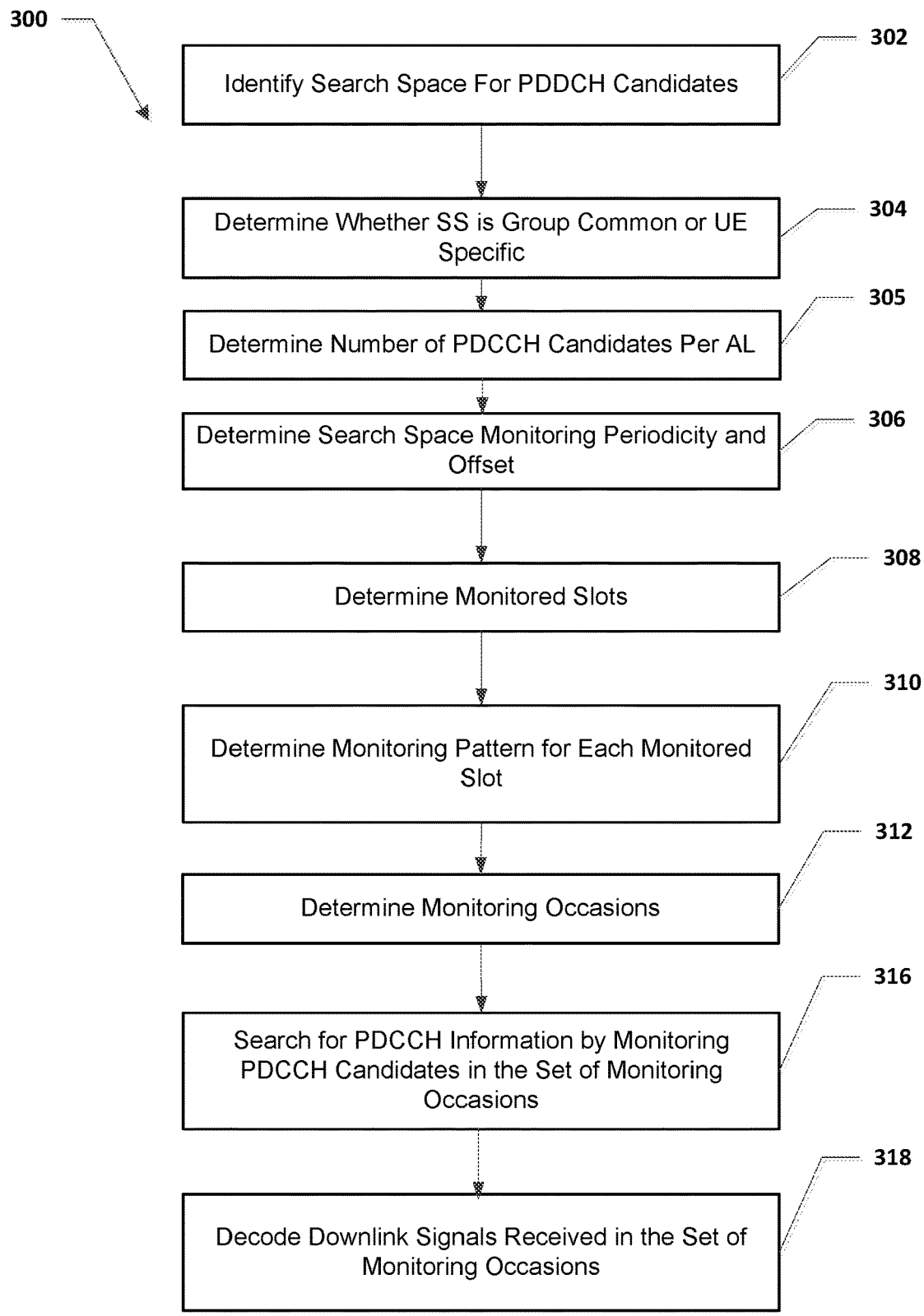
FIG. 3 illustrates a flow diagram of an exemplary method for decoding downlink signals in accordance with some examples.

FIG. 3 illustrates an example method 300 that may be performed by a user equipment (UE) device, having a radio frequency (RF) interface configured to receive downlink signals during a plurality of slots. The method includes, at 302, identifying a search space for physical downlink control channel (PDCCH) candidates. The method includes, at 304, determining whether the search space is a group common search space or a UE specific search space. The method includes, at 305, determining a number of PDCCH candidates per aggregation level (AL). The method includes, at 306, determining a monitoring periodicity and monitoring offset for the search space, wherein each comprise a plurality of slots. The method includes, at 308, determining monitored slots in the monitoring periodicity. The method includes, at 310, determining, for each monitored slot, a monitoring pattern comprising a set selected symbols. The method includes, at 312, determining monitoring occasions corresponding to the sets of monitored slots within the monitoring periodicity, and the sets of selected symbols in the monitored slots. The method includes, at 316, searching for PDCCH information by monitoring PDCCH candidates in the set of monitoring occasions. The method includes, at 318, decoding downlink signals received in the set of monitoring occasions.

Mapping and Dropping Rules to Maintain UE BD and CCE Requirements

In Release 15 specifications, mapping and dropping rules have been defined such that if, in a slot, the number of PDCCH BD candidates or the number of CCEs for channel estimation exceed the corresponding minimum requirements, the UE drops the current and all subsequent search space sets configured to be monitored in that slot, wherein the mapping of the search space sets follow in ascending order of the search space set ID (SS_ID). This can result in an entire search space set being dropped even if a single candidate in the search space set results in the total number of BDs or CCEs for channel estimation to exceed the corresponding specified minimum requirements. This may lead to excessive dropping of search space sets, especially for cases wherein search space sets may be configured with a relatively large number of BD candidates or BD candidates with large aggregation levels (ALs)—both being relatively typical in case of scheduling of traffic with low latency and/or high reliability demands like URLLC use cases.

Figure 4:
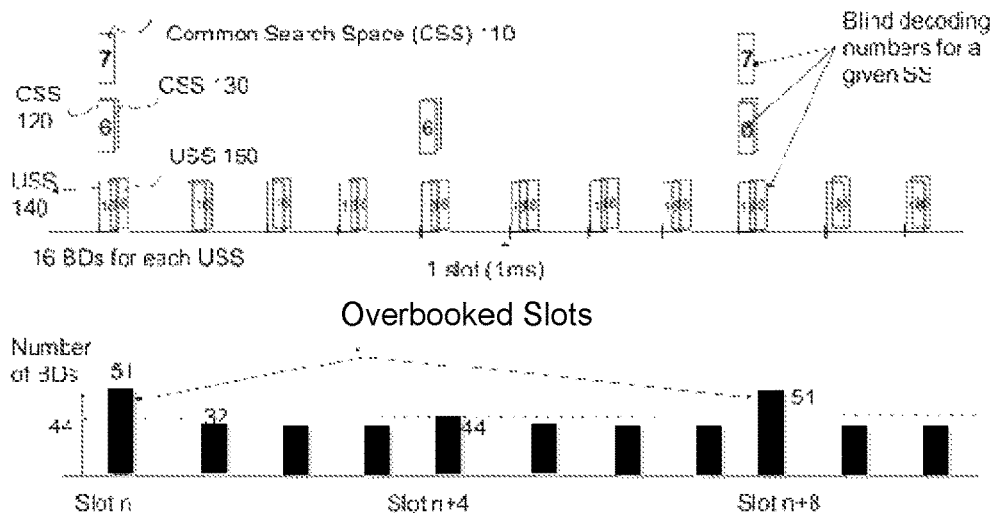
FIG. 4 depicts an example of overbooking of PDCCH candidates.

FIG. 4 illustrates the concept of overbooking of a PDDCH blind decoding operation. A UE is configured with multiple common search spaces (CSS) and UE-specific search spaces (USS) with periodicity of 1, 4, or 8 slots. In this example, the blind decoding attempts for each search spaces are configured by RRC as follows:

CSS 110 (e.g. type0-PDCCH CSS for SI-RNTI)
   4 PDCCH candidates for aggregation level 4 (AL4), and 2 for AL8, and 1 for AL16.
CSS 120/130:
   6 candidates for each SS, including 4 PDCCH candidates for AL4 and 2 for AL8
USS 140/150
   16 PDCCH candidates for each SS, which consist of 6 for AL1, 6 for AL2, 2 for AL4 and 2 for AL 8 (i.e. 6+6+2+2=16 candidates).

Due to the varied periodicity of PDCCH monitoring occasions, the total number of BDs in a given slot may be varied due to different combinations of SS. In some slots (e.g. slot n and n+8 in FIG. 1) the total number of BDs may exceed the maximum BDs threshold or number of CCEs (e.g. 44 in case of SCS=15). In one example, to reduce the impact from dropping of PDCCH candidates upon exceeding the BD or channel estimation minimum requirements, the dropping of PDCCH candidates may be defined at the "candidate level" or a "sub-search space set" level instead of dropping of the entire search space set.

Different approaches can be followed to drop the PDCCH candidates by the gNB and skip/disregard monitoring parts of PDCCH candidates at the UE by exploiting different characteristics, e.g., the nature of the SS, aggregation levels, and DCI types transmitted in the SS in case when the total number of BDs or CCEs across one or multiple SS sets in a slot exceeds the threshold value.

Various options can be considered for identification and prioritization of PDCCH candidates within a search space to realize a finer granularity in mapping to search space set candidates, that may include one or combinations of the following:

1. Based on the AL of the candidates;
2. Based on the CCE-footprint for the candidates:
   a. In one example, the candidates are mapped according to ascending order of their relative contributions to the increase in the numbers of CCEs for channel estimation.
3. Based on location of the monitoring occasions within a slot for the search space set:
   a. In another example, the mapping to PDCCH candidates follows the order of a particular sequence of monitoring occasions within a slot for the search space set, e.g., the monitoring occasions occurring within the first three symbols of a slot, or those within every N symbols (N={2, 3, 7, . . . }, N<14) are prioritized.
4. Based on the search space (SS) type within which a UE shall monitor PDCCH candidates, i.e., common search space (CSS) vs. UE-specific search space (USS).
   a. In an example, some search space prioritizations are defined in parallel to other dropping rule(s). In one example, a common search space can be prioritized and be exempted from dropping rules, unless all candidates from USS are already dropped and the PDCCH BD candidates or the number of CCEs for channel estimation still exceed the corresponding minimum requirements. In another example, the dropping rules may apply to UE-specific search spaces, based on some (e.g., reported) UE capabilities.
5. Based on RNTI values configured for PDCCH monitoring.

Figure 5:
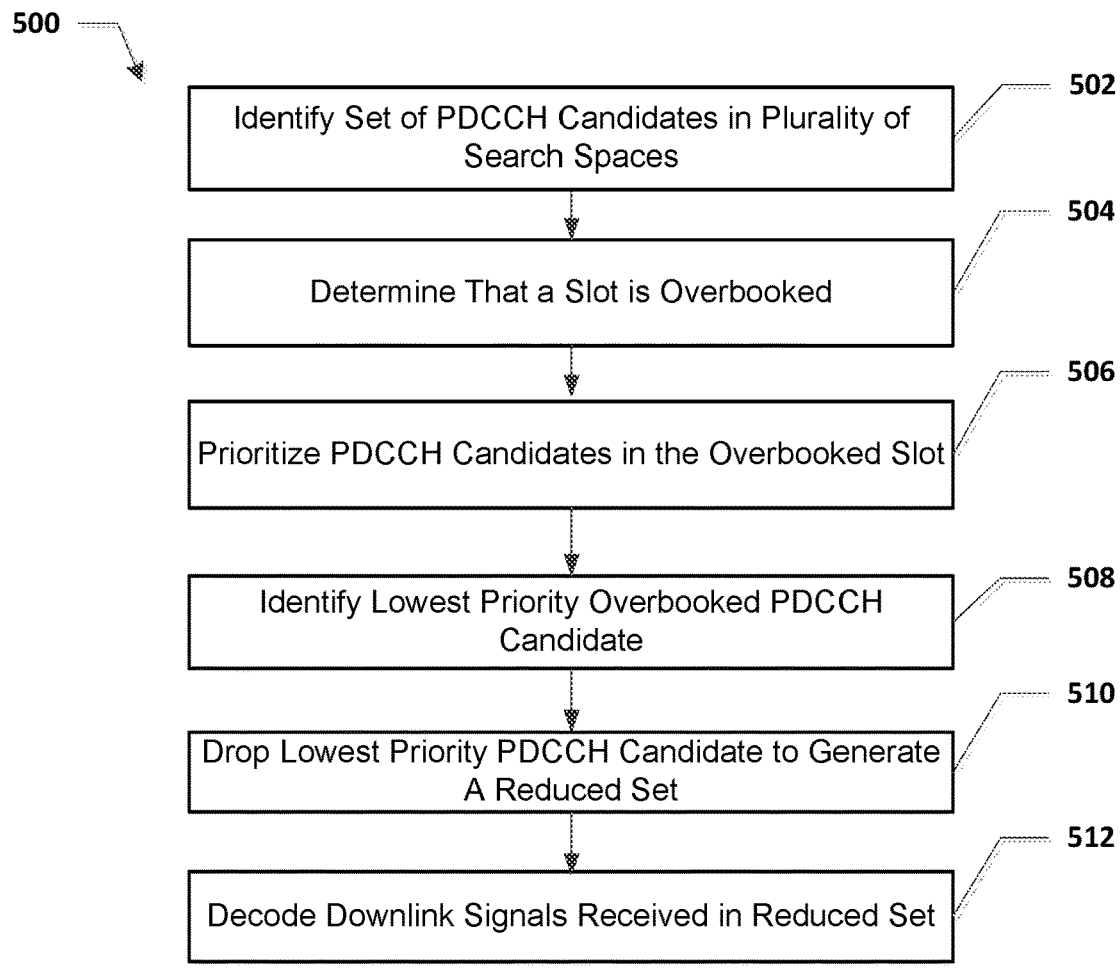
FIG. 5 illustrates a flow diagram of an exemplary method for decoding a downlink signal in accordance with some examples.

FIG. 5 illustrates an example method 500 of decoding downlink signals with a UE. The method includes, at 502, identifying a set of physical downlink control channel (PDCCH) candidates in a plurality of search spaces. At 504, it is determined that a slot is overbooked when the slot comprises a number of blind decoding (BD) candidates or a number of control-channel elements (CCEs) for channel estimation that exceeds a threshold for the UE. At 506, the method includes prioritizing PDCCH candidates in the overbooked slot according to a prioritization criteria (e.g., criteria 1-5 outlined above). At 508, the method includes identifying a lowest priority PDCCH candidate. At 510, the method includes dropping the lowest priority PDCCH candidate from the set of PDCCH candidates to generate a reduced set of PDCCH candidates. At 512, the method includes decoding downlink signals received in the reduced set of PDCCH candidates to search for PDCCH information for the UE. The method 500 may be repeated until the slot is no longer overbooked.

For one or more examples, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section

EXAMPLES

Example 1 is an apparatus for a user equipment (UE) device that includes baseband circuitry having a radio frequency (RF) interface configured to receive downlink signals during a plurality of slots and one or more processors. The one or more processors are configured to identify a search space for physical downlink control channel (PDCCH) candidates by: determining whether the search space is a group common search space or a UE specific search space; determining a number of PDCCH candidates per aggregation level (AL); determining a PDCCH monitoring periodicity and a PDCCH monitoring offset for the search space, each including a plurality of slots; determining monitored slots in the monitoring periodicity; determining, for each monitored slot, a monitoring pattern including a set of selected symbols; and determining a set of monitoring occasions corresponding to the set of selected symbols in each monitored slot of each monitoring periodicity. The one or more processors are configured to decode downlink signals received in the set of monitoring occasions to search for PDCCH information for the UE.

Example 2 includes the subject matter of example 1, including or omitting optional subject matter, wherein the one or more processors are configured to: determine a full monitoring pattern and a reduced monitoring pattern communicated to the UE by higher layer signaling, wherein the full monitoring pattern specifies more symbols than the reduced monitoring pattern, and select either the full monitoring pattern or the reduced monitoring pattern for each monitored slot.

Example 3 includes the subject matter of example 2, including or omitting optional subject matter, wherein the reduced monitoring pattern includes a subset of the monitoring occasions which correspond to the full monitoring pattern.

Example 4 includes the subject matter of example 2, including or omitting optional subject matter, wherein the reduced monitoring pattern includes a first n symbols in a slot.

Example 5 includes the subject matter of example 2, including or omitting optional subject matter, wherein the reduced monitoring pattern includes a set of n contiguous symbols in a slot.

Example 6 includes the subject matter of example 2, including or omitting optional subject matter, wherein the one or more processors are configured to determine the monitored slots based on a monitoringSlotPeriodicityAndOffset parameter communicated to the UE by higher layer signaling, wherein the monitoringSlotPeriodicityAndOffset parameter specifies the PDCCH monitoring offset and the PDCCH monitoring periodicity of subsequent slots to be monitored.

Example 7 includes the subject matter of example 2, including or omitting optional subject matter, wherein the one or more processors are configured to determine the monitored slots based on a parameter communicated to the UE by higher layer signaling, wherein the parameter specifies a set of slots that are monitored in each monitoring periodicity.

Example 8 includes the subject matter of example 7, including or omitting optional subject matter, wherein the one or more processors are configured to determine the full monitoring pattern based on a monitoredSymbolsWithinSlot parameter communicated to the UE by higher layer signaling, wherein the monitoredSymbolsWithinSlot parameter specifies selected symbols within a monitored slot.

Example 9 includes the subject matter of example 8, including or omitting optional subject matter, wherein the one or more processors are configured to determine the reduced monitoring pattern based on a monitoredSymbolsWithinSlot2 parameter communicated to the UE by higher layer signaling, wherein the monitoredSymbolsWithinSlot2 parameter specifies selected symbols within a monitored slot.

Example 10 includes the subject matter of example 9, including or omitting optional subject matter, wherein the one or more processors are configured to: apply the full monitoring pattern to the set of monitored slots within the monitoring periodicity; and apply the reduced monitoring pattern to remaining slots within the monitoring periodicity.

Example 11 includes the subject matter of example 9, including or omitting optional subject matter, wherein the one or more processors are configured to: apply the full monitoring pattern to the set of monitored slots within the monitoring periodicity; and apply the reduced monitoring pattern to the slots outside the set of monitored slots, still within the monitoring periodicity.

Example 12 includes the subject matter of example 2, including or omitting optional subject matter, wherein the one or more processors are configured to determine a set of monitored slots based on a bitmap of equal length to the monitoring periodicity that identifies selected monitored slots within the monitoring periodicity.

Example 13 includes the subject matter of example 2, including or omitting optional subject matter, wherein the one or more processors are configured to: determine slots for full monitoring and slots for reduced monitoring based on a bitmap of equal length to the monitoring periodicity that identifies selected slots for full monitoring and selected slots for reduced monitoring; apply the full monitoring pattern to the slots for full monitoring within the monitoring periodicity; and apply the reduced monitoring pattern to the slots for reduced monitoring within the monitoring periodicity.

Example 14 includes the subject matter of example 2, including or omitting optional subject matter, wherein the one or more processors are configured to: apply the full monitoring pattern to slots within a subset of monitored slots specified in a parameter monitoringDuration2 or a bitmap MonitoringSlots2 that identifies a subset of the set of monitored slots within the monitoring periodicity.

Example 15 includes the subject matter of example 14, including or omitting optional subject matter, wherein the one or more processors are configured to: apply the reduced monitoring pattern to remaining slots in the set of monitored slots; and perform no monitoring in the slots outside the set of monitored slots, still within the monitoring periodicity.

Example 16 includes the subject matter of example 2, including or omitting optional subject matter, wherein the one or more processors are configured to determine the reduced monitoring pattern based on higher layer signaling.

Example 17 includes the subject matter of example 2, including or omitting optional subject matter, wherein the one or more processors are configured to determine the monitoring periodicity, the monitored slots, and the monitoring pattern, based on higher layer signaling.

Example 18 includes the subject matter of example 1, including or omitting optional subject matter, wherein the one or more processors are configured to determine the monitoring periodicity, the monitored slots, and the monitoring pattern based on a media access control (MAC) control element CE.

Example 19 includes the subject matter of example 1, including or omitting optional subject matter, wherein the one or more processors are configured to determine the monitoring periodicity, the monitored slots, and the monitoring pattern based on a group common PDCCH carrying downlink control information (DCI) or UE specific PDCCH carrying DCI.

Example 20 includes the subject matter of example 1, including or omitting optional subject matter, wherein the one or more processors are configured to associate different transmission configuration information (TCI)-states or quasi co-location (QCL) assumptions to different instances of monitoring occasions, across repetitions of monitoring slots within a duration for the same search space set.

Example 21 includes the subject matter of example 1, including or omitting optional subject matter, wherein the one or more processors are configured to associate different transmission configuration information (TCI)-states or quasi co-location (QCL) assumptions to different instances of monitoring occasions, across repetitions of monitoring slots within a duration for the same search space set when a carrier frequency of a transmission is higher than about 6 GHz.

Example 22 includes the subject matter of example 1, including or omitting optional subject matter, wherein the one or more processors are configured to determine the monitoring periodicity, the monitoring offset, or the monitored slots based on time intervals that span less than a slot duration or that span a set of slots.

Example 23 includes the subject matter of example 1, including or omitting optional subject matter, wherein the one or more processors are configured to determine the monitored slots in the monitoring periodicity with a granularity not equal to a slot.

Example 24 is an apparatus for a user equipment (UE) device, including baseband circuitry having a radio frequency (RF) interface configured to receive downlink signals during a plurality of downlink slots and one or more processors. The one or more processors are configured to: identify a set of physical downlink control channel (PDCCH) candidates in a plurality of search spaces, wherein each search space is associated with one or more monitoring occasions, a set of aggregation levels (ALs), and a number of PDCCH candidates for each AL; determine, based on the set of PDCCH candidates, that a slot is overbooked, wherein an overbooked slot includes a number of blind decoding (BD) candidates or a number of control-channel elements (CCEs) for channel estimation that exceeds a threshold; and in response, prioritize PDCCH candidates in the overbooked slot; identify a lowest priority PDCCH candidate; drop the lowest priority PDCCH candidate from the set of PDCCH candidates to generate a reduced set of PDCCH candidates; and decode downlink signals received in the reduced set of PDCCH candidates to search for PDCCH information for the UE.

Example 25 includes the subject matter of example 24, including or omitting optional subject matter, further including prioritizing PDCCH candidates, identifying the lowest priority PDCCH, and dropping the lowest priority PDDCH candidate until the number of BD candidates or CCEs for channel estimation meets the threshold.

Example 26 includes the subject matter of example 24, including or omitting optional subject matter, wherein the one or more processors are configured to assign a higher priority to PDCCH candidates associated with a group-common search space as compared to PDCCH candidates associated with a UE specific search space.

Example 27 includes the subject matter of example 24, including or omitting optional subject matter, wherein the one or more processors are configured to exempt group common search spaces in the plurality of search spaces from prioritization until all PDCCH candidates from UE specific search spaces have been dropped and a number of BD candidates or CCEs for channel estimation exceeds the threshold.

Example 28 includes the subject matter of example 24, including or omitting optional subject matter, wherein the one or more processors are configured to prioritize the PDCCH candidates based on a contribution to a total number of CCEs for respective PDCCH candidates.

Example 29 includes the subject matter of example 24, including or omitting optional subject matter, wherein PDCCH candidates including a lower number of CCEs are prioritized above PDCCH candidates including a higher number of CCEs.

Example 30 includes the subject matter of example 24, including or omitting optional subject matter, wherein the one or more processors are configured to prioritize the PDCCH candidates based on an aggregation level (AL) for each respective PDCCH candidate.

Example 31 includes the subject matter of example 24, including or omitting optional subject matter, wherein the one or more processors are configured to prioritize the PDCCH candidates based on a location of monitoring occasions within the overbooked slot for each respective PDCCH candidate.

Example 32 includes the subject matter of example 31, including or omitting optional subject matter, wherein the one or more processors are configured to prioritize the PDCCH candidates following an order of a particular sequence of monitoring occasions within the overbooked slot.

Example 33 includes the subject matter of example 24, including or omitting optional subject matter, wherein the one or more processors are configured to prioritize the PDCCH candidates associated with monitoring occasions occurring within a first three symbols of the overbooked slot, or those within every N symbols (N={2, 3, 7, . . . }, N<14), over other PDCCH candidates.

Example 34 includes the subject matter of example 24, including or omitting optional subject matter, wherein the one or more processors are configured to prioritize the PDCCH candidates based on a search space priority associated with a respective search space that includes each respective PDCCH candidate.

Example 35 includes the subject matter of example 24, including or omitting optional subject matter, wherein the one or more processors are configured to prioritize the PDCCH candidates based on one or more UE capabilities.

Example 36 includes the subject matter of example 24, including or omitting optional subject matter, wherein the one or more processors are configured to prioritize the PDCCH candidates based on a Radio Network Temporary Identifier (RNTI) for the UE.

Any of the above described examples may be combined with any other example (or combination of examples), unless explicitly stated otherwise. The foregoing description of one or more implementations provides illustration and description, but is not intended to be exhaustive or to limit the scope of examples to the precise form disclosed. Modifications and variations are possible in light of the above teachings or may be acquired from practice of various examples.

We claim:

1. An apparatus for a user equipment (UE), comprising baseband circuitry having a radio frequency (RF) interface configured to receive downlink signals during a plurality of slots and one or more processors configured to:
   identify a search space for physical downlink control channel (PDCCH) candidates by
      receiving a search space configuration indicating
         a PDCCH monitoring periodicity and a PDCCH monitoring offset for the search space, each comprising a plurality of slots;
         a monitoring duration comprising a number of consecutive monitored slots in each monitoring periodicity;
         a monitoring pattern indicating, for each monitored slot, a first symbol of a control resource set (CORESET); and
         a bitmap that identifies slots within the monitoring duration to be monitored according to the monitoring pattern; and
      determining a set of monitoring occasions based on the PDCCH monitoring periodicity, the PDCCH monitoring offset, the monitoring duration, and the monitoring pattern; and
   decoding downlink signals received in the set of monitoring occasions to search for PDCCH information for the UE.

2. The apparatus of claim 1, wherein the one or more processors are configured to determine the monitored slots based on a monitoringSlotPeriodicityAndOffset parameter communicated to the UE by higher layer signaling, wherein the monitoringSlotPeriodicityAndOffset parameter specifies the PDCCH monitoring offset and the PDCCH monitoring periodicity.

3. The apparatus of claim 1, wherein the one or more processors are configured to determine the monitored slots based on a parameter communicated to the UE by higher layer signaling, wherein the parameter specifies a set of slots that are monitored in each monitoring periodicity.

4. The apparatus of claim 1, wherein the one or more processors are configured to determine the monitoring pattern based on a monitoredSymbolsWithinSlot parameter communicated to the UE by higher layer signaling, wherein the monitoredSymbolsWithinSlot parameter specifies selected symbols within a monitored slot.

5. The apparatus of claim 1, wherein the bitmap is of equal length to the monitoring periodicity that identifies selected monitored slots within the monitoring periodicity.

6. The apparatus of claim 1, wherein the one or more processors are configured to determine the monitoring periodicity, the monitored slots, and the monitoring pattern based on a group common PDCCH carrying downlink control information (DCI) or UE specific PDCCH carrying DCI.

7. The apparatus of claim 1, wherein the one or more processors are configured to associate different transmission configuration information (TCI)-states or quasi co-location (QCL) assumptions to different instances of monitoring occasions, across repetitions of monitoring slots within a duration for a same search space set.

8. The apparatus of claim 1, wherein the one or more processors are configured to associate different transmission configuration information (TCI)-states or quasi co-location (QCL) assumptions to different instances of monitoring occasions, across repetitions of monitoring slots within a duration for a same search space set when a carrier frequency of a transmission is higher than about 6 GHz.

9. The apparatus of claim 1, wherein the one or more processors are configured to determine the PDCCH monitoring periodicity, the PDCCH monitoring offset, or the monitored slots based on time intervals that span less than a slot duration or that span a set of slots.

10. An apparatus for a user equipment (UE), comprising baseband circuitry having:
a radio frequency (RF) interface configured to receive downlink signals during a plurality of downlink slots; and
one or more processors configured to:
identify a set of physical downlink control channel (PDCCH) candidates in a plurality of search spaces, wherein each search space is associated with one or more monitoring occasions, a set of aggregation levels (ALs), and a number of PDCCH candidates for each AL;
determine, based on the set of PDCCH candidates, that a slot is overbooked, wherein an overbooked slot comprises a number of blind decoding (BD) candidates or a number of control-channel elements (CCEs) for channel estimation that exceeds a threshold; and
in response, until the number of BD candidates or CCEs for channel estimation meets the threshold, prioritize PDCCH candidates in the overbooked slot; identify a lowest priority PDCCH candidate; drop the lowest priority PDCCH candidate from the set of PDCCH candidates to generate a reduced set of PDCCH candidates; and decode downlink signals received in the reduced set of PDCCH candidates to search for PDCCH information for the UE.

11. A method for a user equipment (UE), comprising:
receiving a search space configuration indicating
a PDCCH monitoring periodicity and a PDCCH monitoring offset for the search space, each comprising a plurality of slots;
a monitoring duration comprising a number of consecutive monitored slots in each monitoring periodicity;
a monitoring pattern indicating, for each monitored slot, a first symbol of a control resource set (CORESET); and
a bitmap that identifies slots within the monitoring duration to be monitored according to the monitoring pattern; and
determining a set of monitoring occasions based on the PDCCH monitoring periodicity, the PDCCH monitoring offset, the monitoring duration, and the monitoring pattern; and
decoding downlink signals received in the set of monitoring occasions to search for PDCCH information for the UE.

12. The method of claim 11, comprising determining the monitored slots based on a monitoringSlotPeriodicityAndOffset parameter communicated to the UE by higher layer signaling, wherein the monitoringSlotPeriodicityAndOffset parameter specifies the PDCCH monitoring offset and the PDCCH monitoring periodicity.

13. The method of claim 11, comprising determining the monitored slots based on a parameter communicated to the UE by higher layer signaling, wherein the parameter specifies a set of slots that are monitored in each monitoring periodicity.

14. The method of claim 11, comprising determining the monitoring pattern based on a monitoredSymbolsWithinSlot parameter communicated to the UE by higher layer signaling, wherein the monitoredSymbolsWithinSlot parameter specifies selected symbols within a monitored slot.

15. The method of claim 11, wherein the bitmap is of equal length to the monitoring periodicity that identifies selected monitored slots within the monitoring periodicity.

16. The method of claim 11, comprising determining the monitoring periodicity, the monitored slots, and the monitoring pattern based on a group common PDCCH carrying downlink control information (DCI) or UE specific PDCCH carrying DCI.

17. The method of claim 11, comprising associating different transmission configuration information (TCI)-states or quasi co-location (QCL) assumptions to different instances of monitoring occasions, across repetitions of monitoring slots within a duration for a same search space set.

18. The method of claim 11, comprising associating different transmission configuration information (TCI)-states or quasi co-location (QCL) assumptions to different instances of monitoring occasions, across repetitions of monitoring slots within a duration for a same search space set when a carrier frequency of a transmission is higher than about 6 GHz.

19. The method of claim 11, comprising determining the PDCCH monitoring periodicity, the PDCCH monitoring offset, or the monitored slots based on time intervals that span less than a slot duration or that span a set of slots.

* * * * *